United States Patent
Park et al.

(10) Patent No.: US 8,788,846 B2
(45) Date of Patent: Jul. 22, 2014

(54) CLOUD COMPUTING SYSTEM AND CLOUD SERVER MANAGING METHOD THEREOF

(71) Applicant: Electronics and Telecommunications Research Institute, Daejeon (KR)

(72) Inventors: Jong Youl Park, Daejeon (KR); Seung Yun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/650,178

(22) Filed: Oct. 12, 2012

(65) Prior Publication Data

US 2013/0117557 A1 May 9, 2013

(30) Foreign Application Priority Data

Nov. 3, 2011 (KR) .................. 10-2011-0113645

(51) Int. Cl.
*H04L 29/06* (2006.01)

(52) U.S. Cl.
USPC .......................................... 713/190; 709/203

(58) Field of Classification Search
USPC .......................................... 713/190; 709/203
See application file for complete search history.

(56) References Cited

U.S. PATENT DOCUMENTS

| | | | |
|---|---|---|---|
| 6,405,316 B1 * | 6/2002 | Krishnan et al. | 713/190 |
| 2008/0083031 A1 | 4/2008 | Meijer et al. | |
| 2008/0104217 A1 * | 5/2008 | Srinivasa et al. | 709/223 |
| 2008/0120329 A1 * | 5/2008 | Huh et al. | 707/102 |
| 2008/0276309 A1 * | 11/2008 | Edelman | 726/9 |
| 2010/0211781 A1 | 8/2010 | Auradkar et al. | |

FOREIGN PATENT DOCUMENTS

| | | |
|---|---|---|
| KR | 10-0988198 | 10/2010 |
| KR | 1020110040690 | 4/2011 |
| KR | 1020110051028 | 5/2011 |
| KR | 10-1059199 | 8/2011 |

OTHER PUBLICATIONS

Griffin, John Linwood, et al. "Trusted virtual domains: Toward secure distributed services." Proceedings of the 1st IEEE Workshop on Hot Topics in System Dependability (HotDep'05). 2005.*

* cited by examiner

*Primary Examiner* — Kambiz Zand
*Assistant Examiner* — Michael Guirguis
(74) *Attorney, Agent, or Firm* — Nelson Mullins Riley & Scarborough LLP (57) ABSTRACT

A cloud computing system is disclosed. The cloud computing system includes a management server that manages a plurality of servers and distributes service resources. Each of the servers corresponds to one of a secure server type and a general server type, and the secure server type of server decrypts an encrypted code provided from a client. Accordingly, a secure server can execute a code requiring security. Especially, by classifying a program code as a general code or a secret code, the general server can also perform the partial function of a program.

13 Claims, 6 Drawing Sheets

CLOUD COMPUTING SYSTEM AND CLOUD SERVER MANAGING METHOD THEREOF

CLAIM FOR PRIORITY

This application claims priority to Korean Patent Application No. 10-2011-0113645 filed on Nov. 3, 2011 in the Korean Intellectual Property Office (KIPO), the entire contents of which are hereby incorporated by reference.

BACKGROUND

1. Technical Field

Example embodiments of the present invention relate in general to a cloud computing system and a cloud server managing method thereof, and more specifically to a cloud computing system and a cloud server managing method thereof that strengthen server security.

2. Related Art

Cloud computing is computing that provides virtualized information technology (IT) resources through a service by using Internet technology, and denotes computing in which users borrow and use sufficient IT resources such as software, storage space, a server, and a network, receive real-time scalability supported according to a service load, and pay a cost for used resources.

Cloud computing enables the use of necessary network and computing resources according to various requirements of users, but when secure computing resources are required for privacy, cloud computing has difficulty in providing a service that satisfies various requirements of users and is suitable for privacy.

In this context, since remote work such as telecommuting and work on the move has limitations in security, the related art allows workers to access a company server over a virtual private network (VPN) for protecting company privacy, but is inconvenient to use.

SUMMARY

Accordingly, example embodiments of the present invention are provided to substantially obviate one or more problems due to limitations and disadvantages of the related art.

Example embodiments of the present invention provide a cloud computing system which protects privacy.

Example embodiments of the present invention also provide a method of creating and executing a client code for protecting privacy.

Example embodiments of the present invention also provide a cloud server managing method which protects privacy.

In some example embodiments, a cloud computing system includes: a management server configured to manage a plurality of servers and distribute service resources, wherein, each of the servers corresponds to one of a secure server type and a general server type, and the secure server type of server decrypts an encrypted code provided from a client.

When a program including the encrypted code is received, the management server may request execution of the program from at least one of the servers and the secure server type of server, and the management server may receive a result, which is obtained by determining whether to enable decryption of the encrypted code included in the program, from a server which receives the program execution request.

In other example embodiments, a method of providing a program for a cloud service, which is performed by a client computer, includes: classifying a plurality of codes included in the program into a general code and a secret code requiring security; encrypting a code classified as the secret code to create an encrypted code by using a public key; creating a program package which includes the encrypted code and the general code; and providing the program package to a server.

In still other example embodiments, a method of executing a program, which is executed by a specific server connected to a management server and a plurality of different servers, includes: receiving a program package which includes a code encrypted by using a public key and a general code; and decrypting the encrypted code by using a private key to create a secret code, the specific server retaining the private key.

In yet other example embodiments, a server managing method, which is performed by a specific server of a first subgroup of a cloud computing system including a management server and a plurality of servers classified into at least one or more subgroups, includes: requesting update of a public key or a private key from the management server when one of the servers of the first subgroup is deleted; and transmitting an updated public key or private key to the servers of the first subgroup when the public key or private key updated according to the update request is received from the management server.

The server deleted from the first subgroup may be a secure server type of server which shares a public key or private key shared between a plurality of secure server type of servers, and the updated public key or private key may be transferred from the management server to a plurality of secure server type of servers included in another subgroup through a representative server of the other subgroup.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

The invention may have diverse modified embodiments, and thus, example embodiments are illustrated in the drawings and are described in the detailed description of the invention. However, this does not limit the invention within specific embodiments and it should be understood that the invention covers all the modifications, equivalents, and replacements within the idea and technical scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings. In describing the present invention, like numbers refer to like elements throughout the description of the figures, and a repetitive description on the same element is not provided.

A server managing method in a cloud computing system of the present invention is disclosed. The present invention discloses a method that divides a plurality of cloud servers into two or more groups, and manages and allocates the servers so as to change the use of each of the servers depending on the case and operate each server.

To this end, a cloud computing provider divides a plurality of cloud servers into groups according to functions or performance, issues an official authentication certificate for each of the groups, and thus enables the cloud server to access a server that provides a desired service according to a function a terminal requires.

A terminal classifies codes into a general code and a secret code according to security grades and writes a code before sending desired work or a program to a cloud computing system, and the secret code may be encrypted and transmitted to the nearest cloud server. A cloud server receiving a program tries to decrypt an encrypted code or checks whether there is authority to execute a corresponding program, and when there is no authority, the cloud server may transfer the code to another cloud server connected thereto. That is, by using a broadcasting scheme, the nearest server responds, thus quickly finding a server. A cloud server having authority to execute a program decrypts an encrypted code to create the original program, and executes the original program. A user program whose execution is commissioned to a server by a terminal may include a request message, a web application, and a native program.

Figure 1:
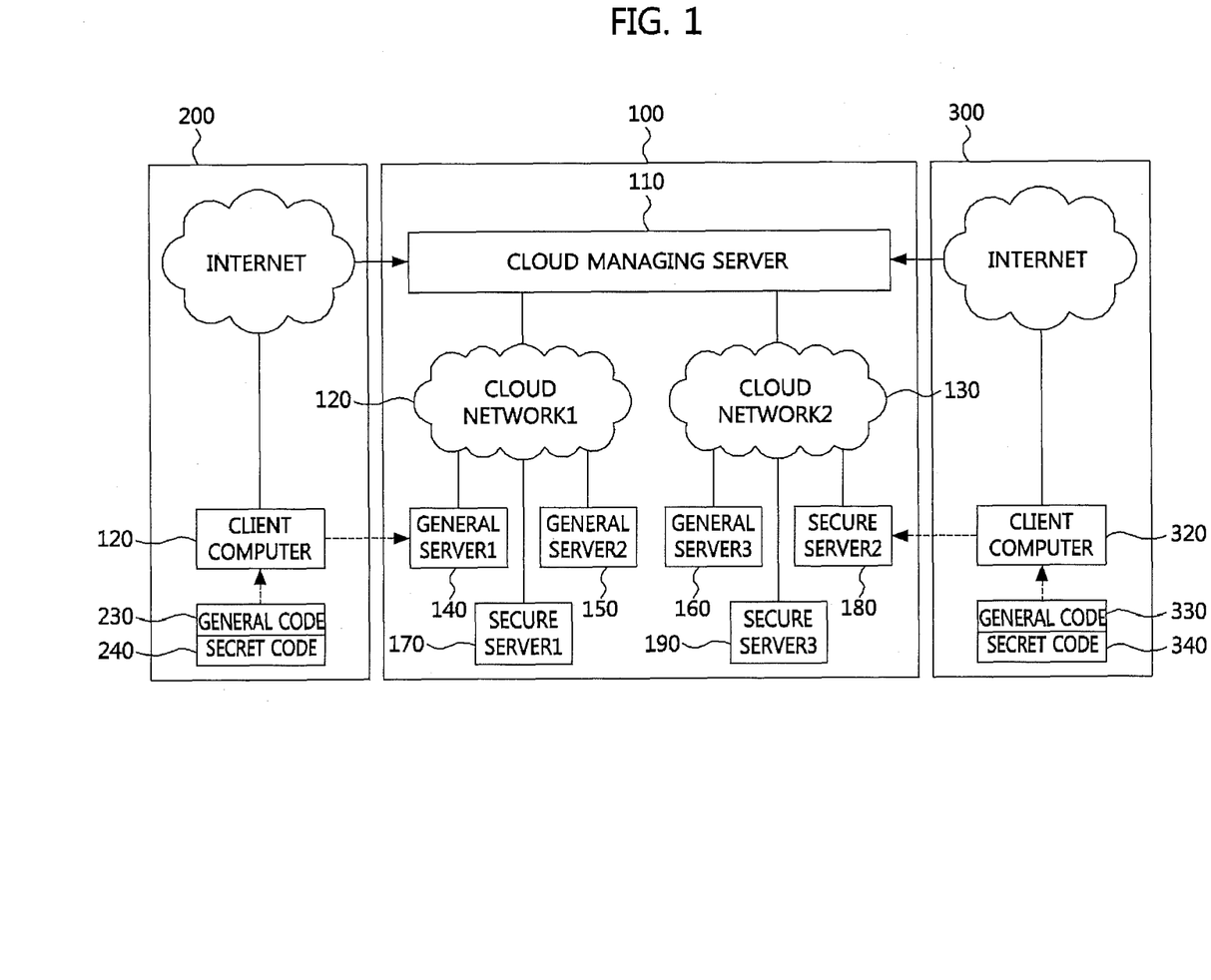
FIG. 1 is a block diagram illustrating a configuration and connection relationship of a plurality of servers in a cloud computing system according to an embodiment of the present invention.

FIG. 1 is a block diagram illustrating a configuration and connection relationship of a plurality of servers in a cloud computing system according to an embodiment of the present invention.

Referring to FIG. 1, the cloud computing system according to an embodiment of the present invention includes a plurality of cloud servers 140 to 190 that provide a cloud service, and a cloud managing server 110 that manages the cloud servers 140 to 190 and distributes cloud service resources.

Moreover, referring to FIG. 1, the cloud servers 140 to 190 may receive a program including a general code 230 and a secret code 240 provided from a client computer 220.

Hereinafter, the servers configuring the cloud computing system according to an embodiment of the present invention and the connection relationship between the servers will be described in detail with reference to FIG. 1.

The cloud managing server 110 manages the cloud servers and distributes resources for a cloud service. One of the cloud servers 140 to 190 may act as a cloud managing server, or a dedicated server for cloud management may be separately disposed.

When the cloud managing server 110 receives programs respectively provided from a plurality of client computers 120 and 320, the cloud managing server 110 may designate one of the cloud servers 140 to 190, and request execution of the programs from the designated server. Alternatively, a client may directly request execution of a program from the nearest server, and a corresponding cloud server may notify a management server of a corresponding fact later.

A program provided from clients 200 and 300 may include the general code 230 or 330 and the secret code 240 or 340. That is, a portion of a program that is considered to be important for security is classified as the secret code 240, and only the secret code 240 may be encrypted and provided.

The cloud servers 140 to 190 are servers that provide the cloud service, and may be grouped with respect to a plurality of server networks 120 and 130. Also, the cloud servers 140 to 190 may be classified as a plurality of general servers 140 and secure servers 170 to 190 according to the verification of security (for example, retention of an authentication certificate).

The secure servers 170 to 190 retain the public key/private key authentication certificate and share the public key/private key therebetween. Therefore, the secure servers 170 to 190 may execute a program including a private key 240 or 340 among programs provided from the client computers 220 and 320. In this case, the secret code 240 or 340 is provided as a code that has been encrypted by using the public key, and the secure serves 170 to 190 may decrypt the encrypted code by using the retained private key without an authentication procedure. Also, the secure servers 170 to 190 may decrypt the encrypted code and thus prove themselves to be secure servers.

On the other hand, the general servers 140 to 160 that do not share the public key/private key cannot decrypt the encrypted code, and thus execute only the general code 230. In this case, when a cloud server receiving a program fails to decrypt an encrypted code included in a program, the cloud managing server 110 may report the failure of decryption such that execution of the program is requested from another server.

For example, a user creates a program necessary for execution, and encrypts a significant code requiring security in the program by using a public key provided from a cloud computing system 100. Then, when the user requests execution of the program from the cloud computing system 100, the cloud managing server 140 may transmit the program to all the servers 140 to 190 capable of performing execution.

User access is independent of whether a connection is wired or wireless, and a user may receive a service directly through a cloud server or the first computer having the ability to execute.

A server receiving a program determines whether to enable the decryption of an encrypted code in the program, and informs the cloud managing server 110 that the server is capable of executing the program, namely, decrypting the encrypted code, thereby executing the program. When there is no server for executing a corresponding program, one of the other servers executes only a general code 230 of a user.

That is, when the server receiving the program is a secure server, the server retains a private key corresponding to a public key that is used to encrypt the encrypted code, and thus may decrypt the code to execute the program without a separate authentication procedure. However, when the server is a general server, the server does not retain the private key, and thus cannot execute the program by failing to decrypt the code. Therefore, only a secure server whose stability has been verified executes a program that includes a code requiring privacy.

Figure 2:
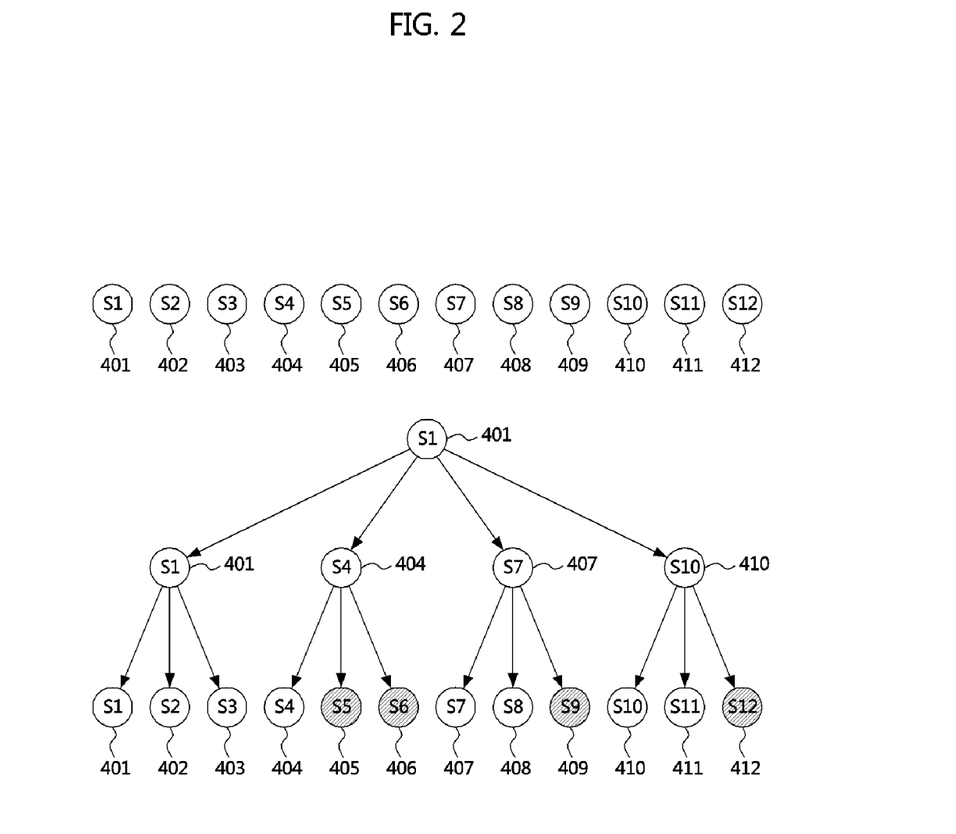
FIG. 2 is a conceptual diagram illustrating a grouping structure of a plurality of cloud servers in a cloud computing system according to an embodiment of the present invention.

FIG. 2 is a conceptual diagram illustrating a grouping structure of a plurality of cloud servers in a cloud computing system according to an embodiment of the present invention.

Referring to FIG. 2, the cloud servers according to an embodiment of the present invention may be configured in a tree structure consisting of a plurality of subgroups that are produced based on proximity to a network.

A plurality of servers 401 to 412 are configured with a plurality of secure servers whose stability has been verified and a plurality of general servers whose stability has not been verified. The subgroups are produced based on proximity to the network. One of the secure servers may become each of representative servers 401, 404, 407 and 410 of the respective subgroups, and one server 401 of the representative servers of the respective subgroups may become the representative server of all the subgroups. For example, S1 401 may be a secure server, a representative server of a subgroup 1, and a representative server of all the subgroups. That is, S1 401 may act as a cloud managing server. A scheme of adding and deleting a new group is the same as a conventional group managing scheme, but when adding a server 412 or deleting a server 411, a function of updating and managing a group key and a public key/private key may be added.

A secure server according to an embodiment of the present invention may share a public key/private key and execute a program including an encrypted code provided from a client. That is, a plurality of secure servers share the public key/private key therebetween even without separately managing a server having authority to execute the program, and thus, a secure server having a corresponding key executes a program according to a commission that is given by a cloud managing server. Referring to FIG. 2, all cloud servers are connected to each other, but in terms of sharing and managing a key, S5 405, S6 406, S9 409, and S12 412 that are general servers may be excluded. That is, general servers may not share a key. The group, members are sharing the same security criteria and mechanism.

Hereinafter, an operation of adding a secure server type of cloud server in the cloud computing system according to an embodiment of the present invention will be described.

Figure 3:
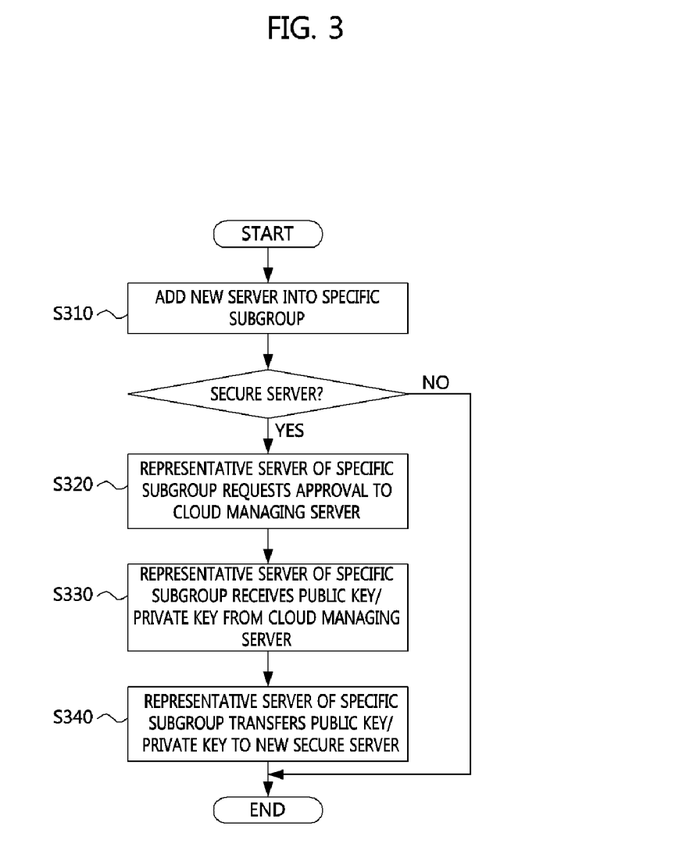
FIG. 3 is a flowchart illustrating an operation of adding a secure server type of cloud server according to an embodiment of the present invention.

FIG. 3 is a flowchart illustrating an operation of adding a secure server type of cloud server according to an embodiment of the present invention.

Referring to FIG. 3, the operation of adding the secure server type of cloud server in the cloud computing system according to an embodiment of the present invention may include stage S310 of adding a new server, stage S320 of requesting approval, stage S330 of receiving a public key/private key, and stage S340 of transferring the public key/private key.

Moreover, referring to FIG. 3, each stage of the operation of adding the secure server type of cloud server in the cloud computing system according to an embodiment of the present invention will be described as follows.

Stage S310 of adding the new server may be a stage in which when a new cloud server is added into the cloud computing system, a new server is added into a subgroup neighboring to a network.

Stage S320 of requesting approval may be a stage in which when the added new server is a secure server type of server, namely, a server that has received authority to decrypt an encrypted code, the new server needs to receive a common public key/private key that is shared between a plurality of secure server type of servers, and thus, a representative server of the subgroup requests provision of the public key/private key to a cloud managing server in association with the addition of a new cloud server.

Stage S330 of receiving the public key/private key may be a stage in which the representative server of the subgroup receives a public key/private key corresponding to an approval request from the cloud managing server.

Stage S340 of transferring the public key/private key may be a stage of transferring the public key/private key, received from the cloud managing server, to the new cloud server.

That is, as described above, the addition of a new secure server may be a function in which a representative server of a corresponding subgroup transfers a public key/private key to the new secure server.

Hereinafter, an operation of deleting a secure server type of cloud server in the cloud computing system according to an embodiment of the present invention will be described.

Figure 4:
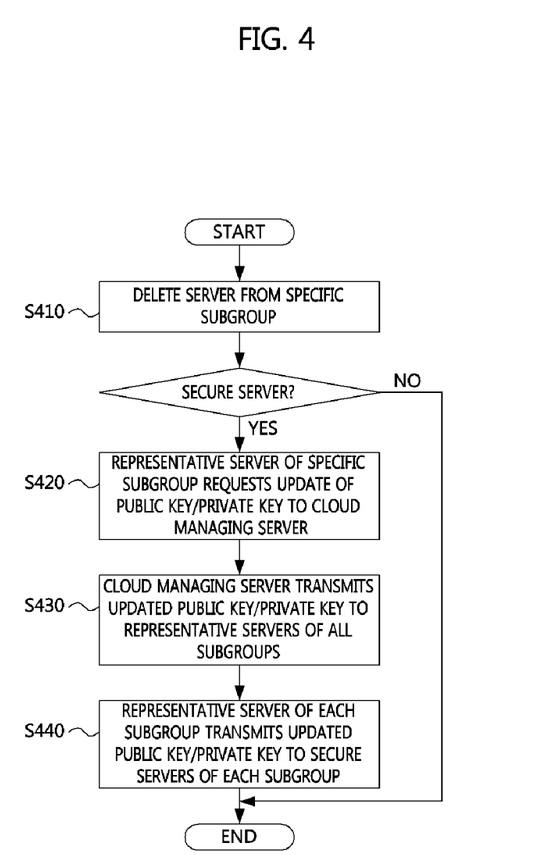
FIG. 4 is a flowchart illustrating an operation of deleting a secure server type of cloud server according to an embodiment of the present invention.

FIG. 4 is a flowchart illustrating an operation of deleting a secure server type of cloud server according to an embodiment of the present invention.

Referring to FIG. 4, the operation of deleting the secure server type of cloud server according to an embodiment of the present invention may include stage S410 of deleting a server, stage S420 of updating a public key/private key, stage S430 of transmitting the public key/private key, and stage S440 of transferring the public key/private key.

Moreover, referring to FIG. 4, each stage of the operation of deleting the secure server type of cloud server according to an embodiment of the present invention will be described as follows.

A cloud server included in a specific subgroup is deleted in stage S410, and when the cloud server corresponds to a secure server type, a public key/private key shared between a plurality of servers corresponding to the secure server type is required to be updated. Therefore, when a server corresponding a secure server type is deleted, the following stages S420 to S440 are performed.

Stage S420 of updating the public key/private key is a stage in which a representative server of a subgroup including the deleted server requests update of the public key/private key to a cloud managing server.

Stage S430 of transmitting the public key/private key is a stage in which the cloud managing server updates a public key/private key according to the update request, and then transmits the updated public key/private key to representative servers of the respective subgroups.

Stage S440 of transferring the public key/private key is a stage in which the representative servers of the respective subgroups receiving the updated public key/private key transfers the public key/private key to a plurality of secure server type of cloud servers included in the respective subgroups.

In this way, when a secure server is deleted, a cloud managing server may update a public key/private key for protecting security, and the public key/private key may be distributed to a plurality of secure servers through a representative server of a subgroup.

The cloud servers of the cloud computing system according to an embodiment of the present invention may be classified as a server (i.e., secure server) whose stability has been verified and thus which is capable of executing a program requiring security, or as a general server whose stability has not been verified. A program requiring security that may be executed by the secure server includes an encrypted code, and thus, the general server cannot the program.

Hereinafter, an operation of creating and executing the program requiring security will be described.

Figure 5:
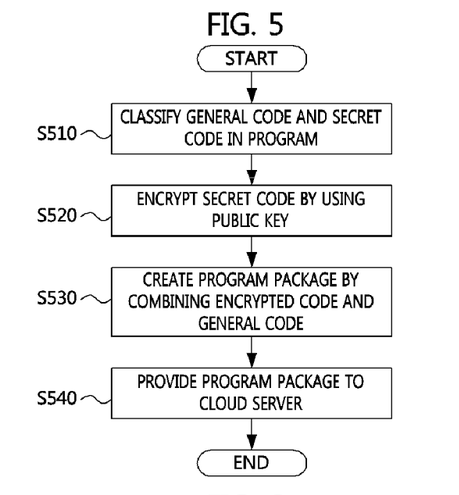
FIG. 5 is a flowchart illustrating an operation of providing a program for a cloud service according to an embodiment of the present invention.

FIG. 5 is a flowchart illustrating an operation of providing a program for a cloud service according to an embodiment of the present invention.

Referring to FIG. 5, the operation of providing the program for the cloud service according to an embodiment of the present invention may include stage S510 of classifying a plurality of codes, stage S520 of encrypting a code, stage S530 of creating a program package, and stage S540 of providing the program package.

Moreover, referring to FIG. 5, each stage of the operation of providing the program for the cloud service according to an embodiment of the present invention will be described as follows.

Stage S510 of classifying a plurality of codes may be a stage of classifying the codes included in the program for the cloud service as general codes and secret codes requiring security.

Stage S520 of encrypting a code may be a stage of encrypting a code classified as a secret code to create an encrypted code by using a public key. Here, the public key may be provided from a server that will execute the program for the cloud service or the system.

Stage S530 of creating the program package may be a stage of creating the program package by combining the encrypted code and the general code. That is, a portion of the general code which stores an address for calling the secret code is changed to an address for calling the encrypted code, and thus, the program package may be created by combining the encrypted code and the general code.

Stage S540 of providing the program package may be a stage of providing the created program package to a server that will provide the cloud service.

Figure 6:
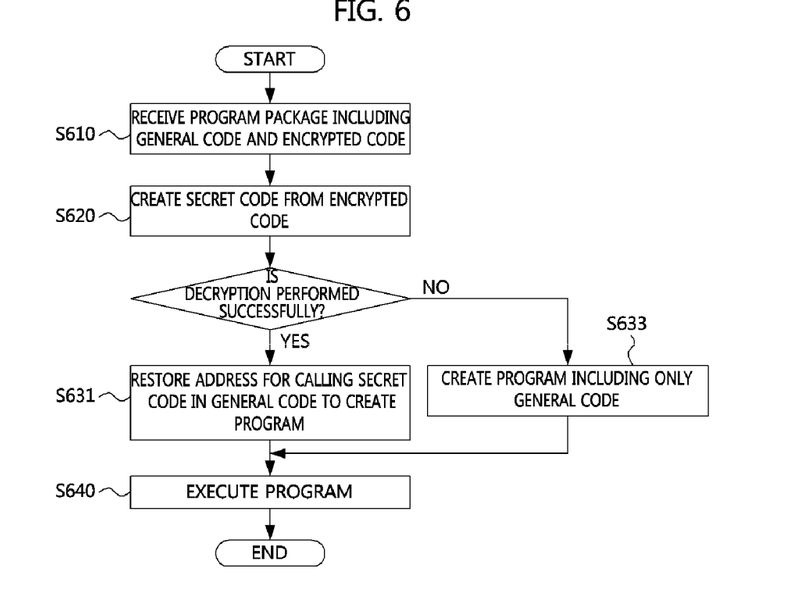
FIG. 6 is a flowchart illustrating an operation of executing a program for a cloud service according to an embodiment of the present invention.

FIG. 6 is a flowchart illustrating an operation of executing a program for a cloud service according to an embodiment of the present invention.

Referring to FIG. 6, the operation of executing the program for the cloud service according to an embodiment of the present invention may include stage S610 of receiving the program package, stage S620 of creating a secret code, stages S631 and S633 of creating a program, and stage S640 of executing the program.

Moreover, referring to FIG. 6, each stage of the operation of executing the program for the cloud service according to an embodiment of the present invention will be described as follows.

Stage S610 of receiving the program package may be a stage of receiving the program package including a code created by a user from a client of the cloud computing system. Here, the program package may include a code that has been encrypted by using a public key, and a general code. Also, the encrypted code may be a code that has been encrypted by using a public key corresponding to a secret key that cloud servers of the cloud computing system, and particularly, a plurality of secure server type of servers retain.

Stage S620 of creating the secret code may be a stage of decrypting the encrypted code included in the program package by using a secret key that a cloud server retains, thereby creating the original secret code. Here, the secret code is a code requiring security, and may be a code which has been encrypted and transmitted such that the secret code is executed by only a cloud server corresponding to a secure server type.

When the decryption of the encrypted code fails, the failure result is transferred to a cloud managing server, thereby enabling the cloud managing server to allocate execution of a corresponding program to another cloud server.

Stage S631 of creating the program may be a stage in which when the secret code is restored by succeeding in decrypting the code that has been encrypted in stage S620 of creating the secret code, an address for calling the secret code is restored from the general code, and thus, the program is created by integrating the created secret code and the general code as one program.

Stage S633 of creating a program may be a stage in which when the secret code is not restored by failing to decrypt the code that has been encrypted in stage S620 of creating the secret code, the created secret code is not restored irrespective of the restoration of an address for calling the secret code from the general code, and thus, the program including only the general code is created because an empty code is returned.

Stage S640 of executing the program may be a stage that executes the program that has been created in stage S631 or stage S633. In this case, when the secret code is successfully restored, the program including both the general code and the secret code may be executed, or when the restoration of the secret code fails, the program including only the general code is executed.

That is, a secret code may be restored and executed by only a cloud server corresponding to a secure server type that retains a private key corresponding to a public key which was used in encrypting the secret code.

Figure 7:
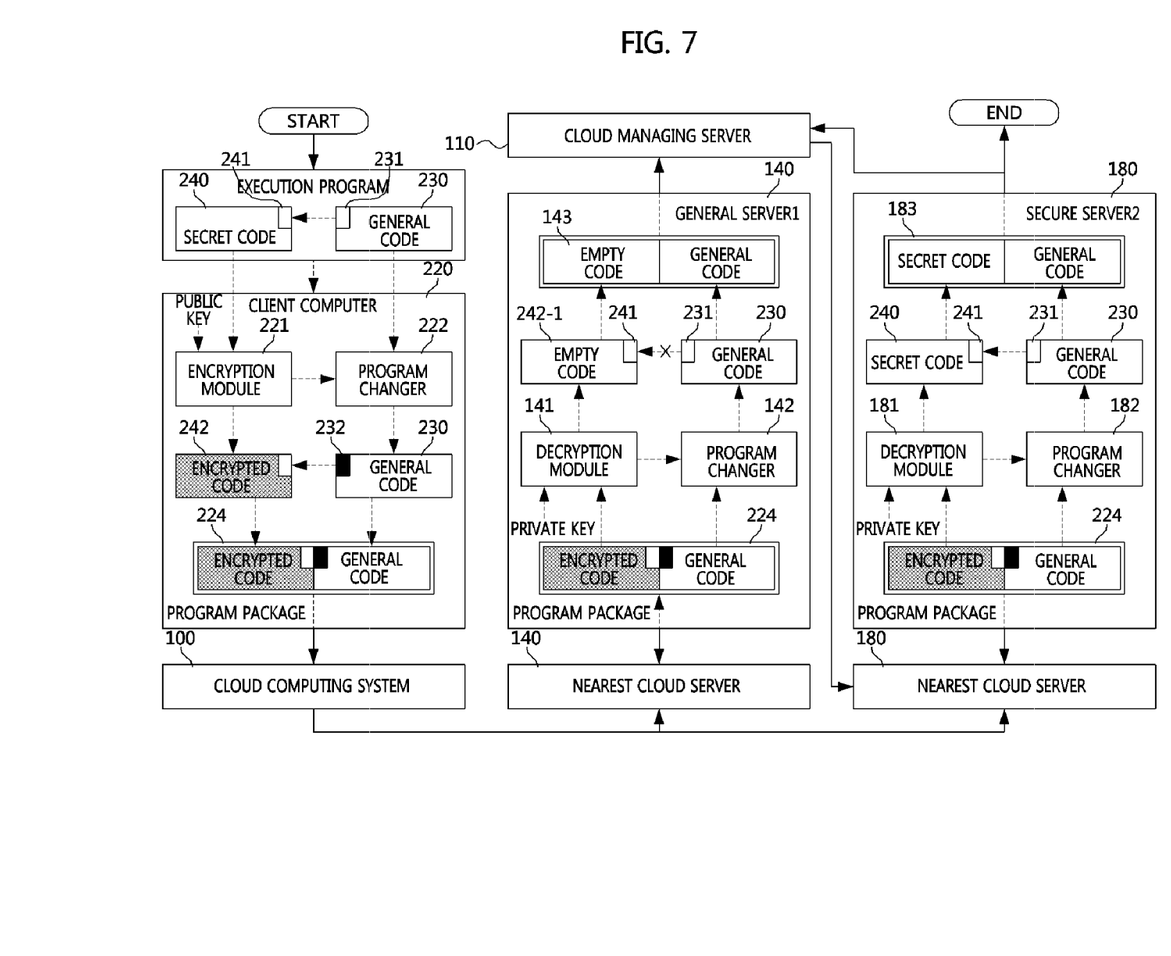
FIG. 7 is a block diagram illustrating an operation of encrypting and decrypting a code of a program for a cloud service according to an embodiment of the present invention, in terms of a client and a server.

FIG. 7 is a block diagram illustrating an operation of encrypting and decrypting a code of a program for a cloud service according to an embodiment of the present invention, in terms of a client and a server.

Referring to FIG. 7, the operation of encrypting and decrypting a code of a program for a cloud service according to an embodiment of the present invention may include an encryption operation that is performed by a client computer 220, and a decryption operation that is performed by a general server 1 (140) and a secure server 2 (180).

Moreover, referring to FIG. 7, the encryption operation that is performed by the client computer 220 will be described as follows.

A user create a general code 230 and a secret code 240 requiring security, and classifies and stores the general code 230 and the secret code 240 in units of a function. Also, an encryption module 221 included in the client computer 220 may encrypt the secret code 240 to create an encrypted code 242. A program changer 222 may change an address 231 for calling a secret code included in the general code 230 to an address 232 for calling the encrypted code. That is, the program changer 222 changes (231→232) and stores a jump address of an execution function.

The encrypted code 242 and the created general code 230 are bundled as one program package 224, which is transferred to the cloud computing system 100. The secret code 240 may be encrypted by using a public key, namely, a public key authentication certificate that is provided when a client joins in a corresponding cloud service.

Moreover, referring to FIG. 7, the operation of decrypting the encrypted code included in the program package provided from the client computer 220 will be described as follows.

A cloud server 140 nearest to the client computer 220 may be selected and execute a corresponding program. In this case, when the selected server 140 corresponds to a general server type, by classifying an encrypted code and a general code that are included in the program package 224, the general code is transferred through a program changer 142 so as to restore a secret code call address, and a decryption module 141 tries to decrypt the encrypted code.

In this case, a secret key shared between a plurality of secure servers in the system may be used. Since the general server 140 does not retain a secret key, the decryption of an encrypted code fails, and thus, a secret code portion may be filled with an empty code 242-1. That is, a function call address 231 of a general code may be designated as an empty function because the decryption of a secret code fails. In a restored program 143, only a general code portion other than a secret code portion is executed. When a secret code is not executed, the cloud server 140 may inform the cloud server 110 of relevant content.

When a cloud managing server 110 confirms that a nearest cloud server 140 which has been designated to execute the program has no authority for executing the program (i.e., secret code), the cloud managing server 110 may designate another cloud server or another secure server type of cloud server.

Alternatively, the cloud managing server 110 allows a plurality of cloud servers 140 to 190 to simultaneously start work for executing the program, and when a plurality of servers having authority to execute a corresponding program, namely, a rightful public key, notify the cloud managing server 110 of whether to enable execution, the cloud managing server 110 may designate a server that will execute the program.

When a nearest cloud server 180 corresponds to a secure server type, an encrypted program classifies the encrypted code 224 and the general code 230. In this case, the general code 230 is transferred through a program changer 182 for restoring an address 231 that designates a secret code 242 according to a function call relationship, and a decryption module 181 tries to decrypt the encrypted code 224. Here, the encrypted code 224 may be decrypted by using a private key shared between a plurality of secure servers.

A secure server 2 (180) has a rightful private key, and thus, by successfully performing decryption, the secret code 242 may be normally restored. A function call address 231 of a general code is restored to an execution address of a secret code, and two codes 230 and 242 are integrated as one program and normally executed.

In the cloud computing system according to an embodiment of the present invention, by maintaining a general server and a secure server whose stability has been verified, the secure server can execute a code requiring security. Especially, by classifying a program code into a general code and a secret code, the general server can also perform the partial function of a program. The general code is used as a code necessary for work, or can be variously used as in a code for evaluating the security of a server before executing the secret code.

Moreover, in cloud computing, the type of each server that executes corresponding work can be changed depending on requirements for security of work, without maintaining all servers as secure servers, thus increasing cost efficiency. Particularly, by enabling a company providing a financial service to autonomously manage the secure server, cloud computing for a financial service whose privacy is protected can be provided.

While example embodiments of the present invention and their advantages have been described in detail, it should be understood that various changes, substitutions and alterations may be made herein without departing from the scope of the invention.

What is claimed is:

1. A cloud computing system comprising:
   a management server configured to manage a plurality of servers and distribute service resources,
   wherein,
   each of the servers corresponds to one of a secure server type and a general server type,
   the secure server type of server decrypts an encrypted code of a program provided from a client, and
   secret code of the program is executed by one or more secure server type of servers and general code of the program is executed by one or more general server type of servers.

2. The cloud computing system of claim 1, wherein when a program including the encrypted code is received,
   the management server requests execution of the program from at least one of the servers and the secure server type of server, and
   the management server receives a result of determining whether to enable decryption of the encrypted code comprised in the program from a server which receives the program execution request.

3. The cloud computing system of claim 1 or 2, wherein the secure server type of servers share a public key and a private key which are provided from the management server, and decrypt the encrypted code comprised in the program by using the private key.

4. The cloud computing system of claim 1, wherein,
   the plurality of servers are classified into at least one or more subgroups based on proximity to a network,
   each of the subgroups comprises at least one or more secure servers, and one of the secure servers is a representative server of each subgroup, and
   the representative server of each subgroup supports addition or deletion of a new server to or from each subgroup.

5. The cloud computing system of claim 4, wherein when an approval request for addition of a secure server type of new server is received from a representative server of a first subgroup of the subgroups, the management server transfers a public key or a private key corresponding to the approval request to the representative server of the first subgroup.

6. The cloud computing system of claim 4, wherein when an update request for a public key or a private key according to deletion of a secure server type of server is received from a representative server of a first subgroup of the subgroups, the management server updates the public key or the private key according to the update request, and transmits the updated public key or private key to the representative servers of the subgroups.

7. A method of providing a program for a cloud service, which is performed by a client computer, the method comprising:
classifying a plurality of codes comprised in the program into a general code and a secret code requiring security;
encrypting a code classified as the secret code to create an encrypted code by using a public key;
creating a program package which comprises the encrypted code and the general code; and
providing the program package to a server,
wherein the client computer is classified into a secure sever type and a general sever type, and
the secret code of the program is executed by one or more secure server type of servers and the general code of the program is executed by one or more general server type of servers.

8. The method of claim 7, wherein the creating of the program package comprises changing a portion of the general code that stores an address for calling the secret code into an address for calling the encrypted code, and creating the program package.

9. A method of executing a program which is executed by a specific server connected to a management server and a plurality of different servers, the method comprising:
classifying the plurality of different servers into a secure sever type and a general sever type;
receiving a program package which includes a code encrypted by using a public key and a general code; and
decrypting the encrypted code by using a private key to create a secret code, the specific server retaining the private key,
wherein,
the secret code of the program is executed by one or more secure server type of servers and the general code of the program is executed by one or more general server type of servers.

10. The method of claim 9, further comprising:
when the creating of a secret code succeeds in decrypting the encrypted code,
restoring an address for calling the secret code in the general code; and
integrating the created secret code and the general code as one program to execute the created program.

11. The method of claim 9, further comprising:
when the creating of a secret code fails to decrypt the encrypted code,
creating and executing only the general code.

12. The method of claim 9, wherein when the creating of the secret code fails to decrypt the encrypted code,
the specific server notifies the management server of the decryption failure, and
the management server requests execution of the program from one of the different servers.

13. The method of claim 9, wherein,
each of the servers and the specific server corresponds to one of a secure server type and a general server type,
the secure server type of servers share a private key for decrypting the encrypted code, and
the encrypted code is encrypted by using a public key corresponding to the private key.

* * * * *